May 5, 1964
E. M. FORD
3,131,723
HYDRAULIC CONTROL VALVE
Filed Nov. 22, 1960
2 Sheets-Sheet 1
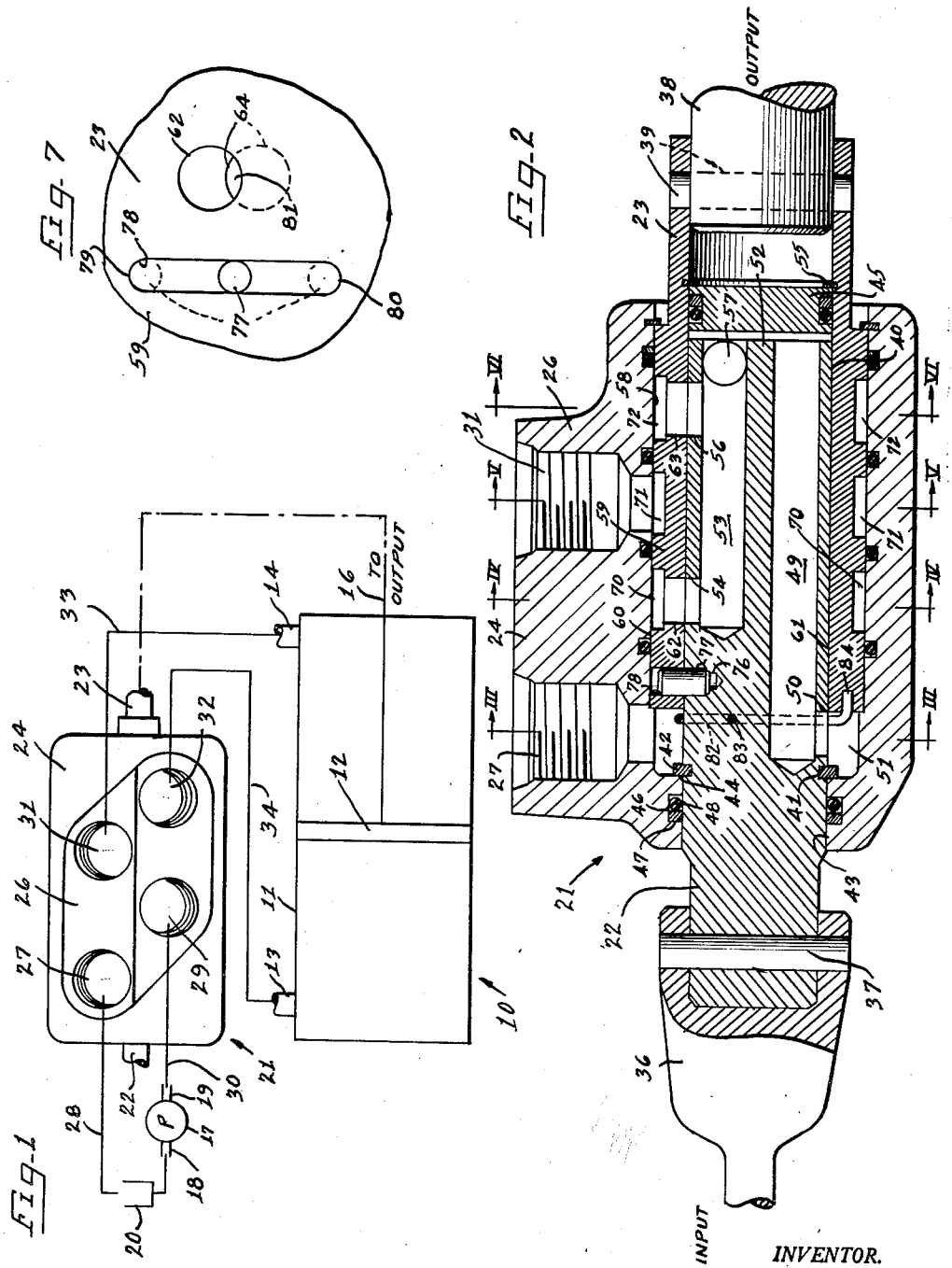
INVENTOR.
Earl M. Ford
BY
Hill, Sherman, Meroni, Gross & Simpson
ATTORNEYS May 5, 1964  E. M. FORD  3,131,723
HYDRAULIC CONTROL VALVE
Filed Nov. 22, 1960  2 Sheets-Sheet 2
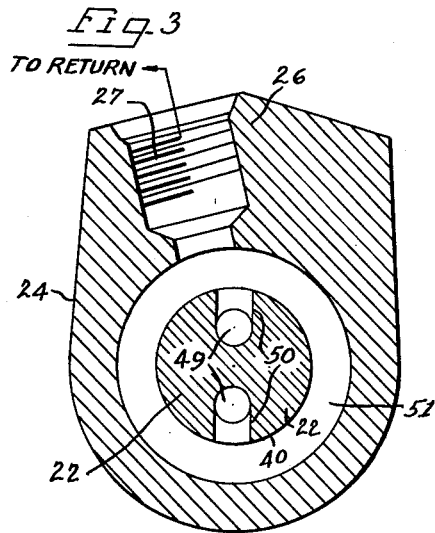
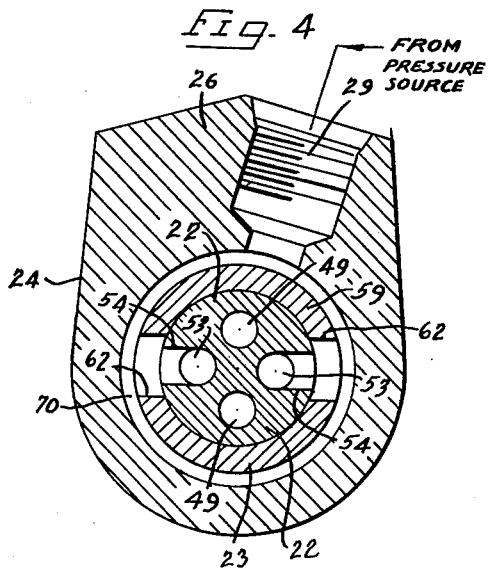
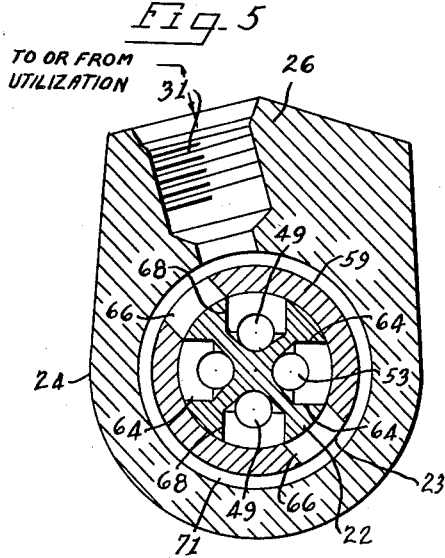
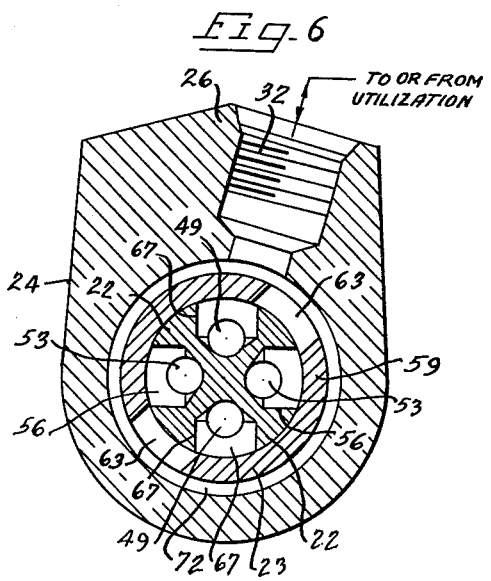
INVENTOR.
Earl M. Ford
BY
Hill, Sherman, Meroni, Gross & Simpson
ATTORNEYS United States Patent Office 3,131,723
Patented May 5, 1964

3,131,723
HYDRAULIC CONTROL VALVE
Earl M. Ford, Birmingham, Mich., assignor to Kingston Products Corporation, Kokomo, Ind., a corporation of Indiana
Filed Nov. 22, 1960, Ser. No. 71,056
4 Claims. (Cl. 137—637.3)

This invention relates generally to the art of hydraulic control and more specifically relates to a power assisting system utilizing a three part rotary control valve which can be advantageously utilized in conjunction with a torque amplifier either as an integral part thereof, or in association therewith.

While the structure of the present invention is generally applicable to any hydraulic system wherein a direct follow up is required between an input member and an output member, a particularly advantageous application of the principles of the present invention is made to a power steering system since the control of the present invention can be interposed directly in the steering column. Thus, the three part control valve may include one part directly connected to the steering column and another part connected to the steering linkage. The third part constitutes a housing and all three of the parts are telescopically related, thereby providing a long axis and insuring a natural bearing relationship between the parts which eliminates the need of separate bearings at the ends of the assembly.

In operation, the input part is rotated in either direction, whereupon pressure ports are communicated with a first set of utilization ports and a second set of utilization ports are communicated with return ports. A torque amplifier is thus actuated, for example, a cylinder on the steering linkage, whereupon the output part will rotate in the same direction as the input part and will follow such angular rotation with a slight lag so that the output part will continue movement after the input part has stopped sufficiently to restore an open center condition in the hydraulic circuitry.

It is an object of the present invention to provide an improved hydraulic system which is specifically characterized by a novel three-part control valve having a rotary action.

Another object of the present invention is to provide a control valve for a steering assisting system which affords full time power steering.

Yet another object of the present invention is to provide a control valve which is particularly applicable to any machinery application wherein a direct follow up is required.

Another object of the present invention is to provide a three piece control valve for a power assisting system wherein all of the parts can be manufactured by ordinary machining operations and wherein a natural bearing relationship is afforded between the parts because of a relatively long axis.

Another object of the present invention is to provide a control valve for a power steering system wherein the valve can be directly interposed in the steering column.

A still further object of the present invention is to provide a rotary control valve for a hydraulic power assisting system wherein concentrically adjacent ports cooperate to provide an improved cut-off which eliminates chatter and affords minimum resistance to movements of adjustment.

Yet another object of the present invention is to provide a control valve for a hydraulic power assisting system wherein the performance response may be adjusted with convenience and accuracy.

Many other features, advantages and additional objects of the present invention will become manifest to those versed in the art upon making reference to the detailed description which follows and the accompanying sheets of drawings in which a preferred structural embodiment of the present invention is shown by way of illustrative example.

On the drawings:

FIGURE 1 is a somewhat schematic plumbing diagram and includes a top plan view of the control valve body or housing illustrating how the ports thereof are connected to other parts of the hydraulic circuitry in a typical power assisting system, for example, in a power steering system of an automotive vehicle;

FIGURE 2 is a cross-sectional view through the control valve of the present invention;

FIGURES 3–6 are each cross-sectional views taken respectively on the planes of lines III—III, IV—IV, V—V and VI—VI of FIGURE 2;

FIGURE 7 is a fragmentary view illustrating the closing relationship of a pair of concentrically adjacent ports in the rotary valve construction of the present invention.

As shown on the drawings:

Although the principles of the present invention are of general application, the present exemplary disclosure is made in connection with a typical power assisting system, for example, a power steering system of an automotive vehicle.

Thus, in the plumbing diagram of FIGURE 1 there is shown a torque amplifier 10 comprising a cylinder 11 having a piston 12 movable therein and first and second ports 13 and 14 are provided at opposite ends to supply fluid under increased pressure to opposite sides of the piston, thereby to move a piston shaft 16 which, in turn, is connected to assist in the driving of a steering linkage.

To drive a stream of fluid through the hydraulic circuitry under increased pressure, there is provided a pump 17 having an inlet 18 and an outlet 19. The inlet of the pump 17 is connected to a reservoir shown at 20.

In accordance with the principles of the present invention, the hydraulic circuit is controlled by a rotary valve shown generally at 21. The rotary valve 21 comprises a three-part assembly which may be conveniently identified in component parts as an input part 22, an output part 23 and a housing part 24.

Referring first of all to the housing part 24, it will be noted there is provided a generally cylindrical sleeve-like member having a boss portion 26 on one side thereof and in which is formed four separate ports, each adapted to be connected to suitable conduit means for incorporation in the hydraulic circuitry.

Reference to FIGURE 1 shows a first port 27 which will be referred to herein as a return port and which is connected by a conduit 28 to the reservoir 20 for returning fluid to the reservoir 20 for supply to the pump inlet 18.

Next, there is formed in the boss 26 a pressure port 29 and which is adapted to be connected via a conduit 30 to the pump outlet 19, thereby receiving hydraulic fluid from a source at increased pressure.

The boss 26 is further formed with a pair of utilization ports including a first port 31 and a second port 32. The port 31 is adapted to be connected via a hydraulic conduit 33 to the port 14 on the torque amplifier, while the port 32 is adapted to be connected via a hydraulic conduit 34 to the port 13 of the torque amplifier 10.

When the principles of the present invention are applied to a power steering system, one of the advantages afforded through the practice of the invention may be realized through direct interposition of the control valve assembly 21 into the steering column. Thus, there is shown a portion of the steering column as at 36 connected to the input part 22 by means of a pin 37. The output part 23 is, in turn, connected to one of the parts of the steering linkage shown at 38 by means of a pin 39.

The input part 22 comprises a rod-like member having a smooth cylindrical outer peripheral surface 40 formed with an annular notch 41 and in which may be seated a stop ring 42. Thus, the housing part 24 may be formed with a throat 43 at one end through which the input part 22 extends and the throat 43 has a shoulder 44 which engages with the stop ring 42 to prevent disassembly of the parts.

Further, the throat 43 is formed with an annular recess 46 in which is received a back-up ring 47 and an O ring sealing member 48 which engages against the peripheral surface 40, thereby to form a shaft-type seal between the throat 43 and the peripheral surface 40 of the input part 22.

The input part 22 has formed therein an axially extending passage 49 having a radial opening 50 which intersects the peripheral surface 40 in register with an annular recess 51 formed in the housing part 24. The annular recess 51 is, in turn, intersected by the return port 27.

The passage 49 may be conveniently formed in the input part 22 by drilling through one end of the input part shown at 52, the end 52 terminating short of the end of the housing part 24.

The input part 22 is further formed with a second axially extending passage 53 which may likewise be formed by drilling into the end face 52. The passage 53 has two axially or longitudinally spaced openings formed therein including a first opening 54 and a second opening 56, both of which intersect the outer peripheral surface 40 of the input part 22. After the passage is formed, the end thereof adjacent the end face 52 is closed by means of a plug 57.

As shown in FIGURES 3–6, the passages 49 and 53 may be duplicated in diametral symmetry in the input part 22 and in view of such relationship, like reference numerals have been applied to functionally corresponding portions of the parts illustrated on the drawings.

The housing part 24 is formed with a cylindrical bore having a bore wall 58 of larger diameter than the outer peripheral surface 40 of the input part 22, thereby to receive in interposed relation a sleeve-like valve portion 59 formed on the output part 23. Thus, the sleeve-like valve portion 59 of the output part 23 has an outer peripheral surface 60 having bearing engagement with the wall 58 and has an inner surface 61 which has bearing engagement with the outer peripheral surface 40.

At opposite diametral points in the sleeve-like valve portion 59 and in register with the openings 54, the output part 23 is formed with openings 62. Likewise, at diametral points and in register with the openings 56, the output part 23 is formed with openings 63.

As shown in FIGURE 5, the input part 22 has openings 64 formed therein in axial register with openings 66 formed in the sleeve-like valve portion 59.

Likewise, in FIGURE 6, the input part 22 is shown formed with openings 67 communicating the passages 49 and lying in axial register with the openings 63 in the sleeve-like valve portion 59. Similar openings 68 are formed in communication with the passage 49 in axial register with the openings 66.

To improve communication between the ports 29, 31 and 32 and the openings 62, 66 and 63, the outer peripheral surface 60 of the sleeve-like valve portion 59 is provided with an annular circumferentially continuous recess 70 at the opening 62, 71 at the openings 66 and 72 at the openings 63.

The end of the bore 61 of the output part 23 adjacent the end 52 of the input part 22 is closed by a plug 45 engaging a stop ring 55 retained in the bore. The plug 45 and the housing 24 has suitable grooves and O rings as necessary to seal the valve parts between the valve lands and ports.

In operation, when the valve 21 is in open center position, fluid at increased pressure from the pump 17 flows through the pressure port 29 but is returned via the port 27 and through the openings 66, 68 and the openings 63, 67.

As soon as the input part 22 is angularly adjusted, for example, by rotation in clockwise direction, the pressure ports or openings 64 move into the openings 66 associated with the port 31 while the openings 67 move into the openings 63 associated with the port 32. Thus, the piston 12 is actuated and the output part 23 will be likewise rotated in a clockwise direction in a manner as to follow the input part 22. When the input part 22 is stopped, the output part 23 continues because of the pressure in the torque amplifier 11 until the open center condition is again reached.

If the input part 22 is rotated in a counterclockwise direction, the pressure ports 56 are moved into the openings 63 and the openings 68 are moved into the openings 66, whereupon the piston 12 will be actuated in an opposite direction, thereby causing the steering linkage part 38 and the output part 23 to be rotated in a counterclockwise direction in a manner as to follow the input part 22.

As applied to a power steering system, it would be desirable to provide a mechanical override between the input part 22 and the output part 23. Accordingly, to accomplish that end, there is shown in FIGURES 2 and 7, a recess 76 formed in the input part 22 and in which is received a pin 77 projecting from the peripheral surface 40 of the input part 22 and confined within an arcuately extending slot 78 formed in the sleeve-like valve portion 59 of the output part 23. The ends of the slot 78 provide abutment shoulders as at 79 and 80 engageable with the pin 77 when it is relatively moved, for example, to the dotted line positions shown in FIGURE 7, thereby mechanically interlocking the input part 22 and the output part 23.

In FIGURE 7, there is also depicted the advantageous cooperation between the generally circular openings forming the ports in the rotary valve of the present invention. For example, the openings 62 and 54 between the sleeve-like valve portion 59 and the input part 22 are shown. Note that when the openings 62 and 64 are moved out of register with one another, there is formed a sector 81 which gradually diminishes in size as relative movement occurs between the adjoining parts. Accordingly, there is no chatter and no resistance to the relative movement between the valve parts.

The valve construction as shown and described thus far would give full time power steering if applied to the power steering system of an automotive vehicle. In order to introduce so-called "road feel" in the system, a continuous biasing could be employed and operatively interconnected between the input part 22 and the output part 23. As illustrating such modification, there is shown herein in FIGURE 2 a torsion spring 82 having one end connected as at 83 to the input part 22 and having its opposite end connected as at 84 to the output part 23. By selecting the rate of the spring 82, the amount of "road feel" can be selectively varied. For example, good results have been afforded through the use of a spring 82 affording approximately 10 pounds of resistance.

Although minor modifications might be suggested by those versed in the art, it should be understood that I wish to embody within the scope of the patent warranted hereon all such modifications as reasonably and properly come within the scope of my contribution to the art.

I claim as my invention:
1. A rotary valve assembly comprising
   a housing part having a generally sleeve-like cylindrical configuration,
      a boss on one side of said housing part having four ports formed therein including
         a pressure port for receiving liquid from a source at increased pressure,
         a return port for returning spent liquid to the source,
         and a pair of utilization ports,
   an input part comprising a rotatable rod-like member having a smooth outer cylindrical surface disposed concentrically inwardly of said housing part, said input part having a first axial passage formed with a radial opening intersecting said cylindrical surface, said housing part having an annular recess intersected by said return port and disposed in register with said return port, said input part having a second axial passage formed with separate radial openings intersecting said cylindrical surface and forming a pressure port and utilization ports, an output part comprising a sleeve-like valve portion interposed between said housing part and said input part and having inner and outer bearing surfaces in bearing engagement with the adjoining surfaces of said housing and input parts, said output part having openings in register with said separate radial openings of said second axial passage, said housing part having an annular recess intersected by said pressure port and disposed in register with one of said separate radial openings, and having an annular recess for intersection by each corresponding utilization port and disposed in register with corresponding openings in said sleeve-like valve portion, said valve adapted to regulate the supply of a continuously supplied pressure source to a power assisting device by moving openings of said input part into openings of said sleeve-like valve member, whereupon the output part will follow in the same angular direction until an open-center position is obtained wherein liquid from the pressure port is returned to the return port.

2. A rotary valve assembly as defined in claim 1 and further characterized by
continuous biasing means operatively interconnected between said input and output parts to impart "feel" to the valve assembly.

3. A rotary valve assembly as defined in claim 1 and further characterized by said radial openings in said input and output parts having a circular configuration so that upon relative rotation of the parts said openings form sectors of gradually diminishing size with improved cut-off action, thereby minimizing resistance to angular adjustment and reducing chatter.

4. A rotary valve assembly as defined in claim 1 and further characterized by
spaced abutment means between said input and output parts to mechanically interlock the parts for insuring operation of the output part in the event of a hydraulic failure.

References Cited in the file of this patent
UNITED STATES PATENTS

| | | |
|---|---|---|
| 2,577,999 | Christensen | Dec. 11, 1951 |
| 2,593,558 | Harbaugh | Apr. 22, 1952 |
| 2,880,586 | Lincoln | Apr. 7, 1959 |
| 2,922,400 | Lorence | Jan. 26, 1960 |
| 3,033,051 | Reinke et al. | May 8, 1962 |
| 3,094,010 | Folkerts | June 18, 1963 |